United States Patent
Lyle et al.

(10) Patent No.: US 10,637,785 B2
(45) Date of Patent: Apr. 28, 2020

(54) SOFTWARE DEFINED NETWORKING MULTIPLE OPERATING SYSTEM ROTATIONAL ENVIRONMENT

(71) Applicant: UCHICAGO ARGONNE, LLC, Chicago, IL (US)

(72) Inventors: Joshua A. Lyle, Chicago, IL (US); Nathaniel Evans, Orland Hills, IL (US)

(73) Assignee: UChicago Argonne, LLC, Chicago, IL (US)

(*) Notice: Subject to any disclaimer, the term of this patent is extended or adjusted under 35 U.S.C. 154(b) by 0 days.

(21) Appl. No.: 15/998,485

(22) Filed: Aug. 16, 2018

(65) Prior Publication Data
US 2020/0059434 A1    Feb. 20, 2020

(51) Int. Cl.
| | |
|---|---|
| H04L 12/741 | (2013.01) |
| H04L 12/801 | (2013.01) |
| H04L 12/64 | (2006.01) |
| H04L 12/855 | (2013.01) |
| H04L 12/721 | (2013.01) |
| H04L 12/851 | (2013.01) |
| H04L 12/937 | (2013.01) |
| H04L 12/833 | (2013.01) |
| H04L 12/715 | (2013.01) |

(52) U.S. Cl.
CPC .......... *H04L 47/2466* (2013.01); *H04L 45/38* (2013.01); *H04L 45/64* (2013.01); *H04L 47/2458* (2013.01); *H04L 47/2483* (2013.01); *H04L 49/254* (2013.01)

(58) Field of Classification Search
CPC .... H04L 63/20; H04L 63/1466; H04L 43/026; H04L 41/0893; H04W 28/24
See application file for complete search history.

(56) References Cited

U.S. PATENT DOCUMENTS

| | | | |
|---|---|---|---|
| 7,697,420 B1 | 4/2010 | Garahi et al. | |
| 7,831,897 B2* | 11/2010 | Heinebrodt | ........... H04L 1/0061 714/821 |
| 9,294,504 B1* | 3/2016 | Evans | ...................... G06F 21/53 |
| 9,654,395 B2* | 5/2017 | Park | ...................... H04L 45/745 |
| 10,084,756 B2* | 9/2018 | Tatlicioglu | .......... H04L 63/0414 |
| 10,148,573 B2* | 12/2018 | Zhang | ..................... H04L 12/10 |
| 2002/0120874 A1 | 8/2002 | Shu et al. | |
| 2004/0025018 A1 | 2/2004 | Haas et al. | |

(Continued)

OTHER PUBLICATIONS

Fan & Fernandez, "A novel SDN based stealthy TCP connection handover mechanism for hybrid honeypot systems," 2017 IEEE Conference on Network Softwarization (NetSoft), 9 pages (2017).

(Continued)

*Primary Examiner* — Rasheed Gidado
(74) *Attorney, Agent, or Firm* — Foley & Lardner LLP (57) ABSTRACT

Systems, methods, and storage media for utilizing software defined networking for a multiple operating system rotational environment, executing on a computing device are disclosed. Some implementations may: receive a request from a user device; modify a packet of the request with a destination address and a port of a first server; forward the modified packet of the request to a controller server; receive a flow modification from the controller server based on the modified packet; and modify further received packets from the user device based on the received flow modification.

17 Claims, 4 Drawing Sheets

(56) References Cited

U.S. PATENT DOCUMENTS

| | | | |
|---|---|---|---|
| 2011/0142156 A1 | 6/2011 | Haartsen | |
| 2014/0289867 A1 | 9/2014 | Bukai | |
| 2014/0317684 A1* | 10/2014 | Porras | H04L 63/20 |
| | | | 726/1 |
| 2016/0065612 A1 | 3/2016 | Evans et al. | |
| 2017/0005943 A1* | 1/2017 | Raj | H04L 45/38 |
| 2018/0097784 A1 | 4/2018 | Evans et al. | |
| 2018/0115470 A1* | 4/2018 | Huang | H04L 41/0873 |

OTHER PUBLICATIONS

Lotia, "SDN-Intrusion-Prevention-System-Honeypot," retrieved from https://github.com/pratiklotia/SDN-Intrusion-Prevention-System-Honeypot, 16 pages (2017).

"National Cyber Leap Year Summit 2009: Co-Chairs' Report," The Networking and Information Technology Research and Development Program, 58 pages (2009).

Albrechtsen, "A qualitative study of users' view on information security," Computers & Security 26(4), pp. 276-289 (2007).

Al-Shaer, "Toward Network Configuration Randomization for Moving Target Defense," Advances in Information Security 54, Moving Target Defense, pp. 153-159 (2011).

Al-Shaer, et al., "Random Host Mutation for Moving Target Defense," Lecture Notes of the Institute for Computer Sciences, Social Informatics and Telecommunications Engineering 106, Security and Privacy in Communication Networks: SecureComm 2012, 18 pages (2013).

Arbor Networks, "The Growing Threat of Application-Layer DDoS Attacks," 20 pages (2012).

Azab & Eltoweissy, "CyberX: A biologically-inspired platform for cyber trust management," Collaborative Computing: Networking, Applications and Worksharing (CollaborateCom), pp. 655-663 (2012).

Azab, et al., "ChameleonSoft: A Moving Target Defense System," 7th International Conference on Collaborative Computing: Networking, Applications and Worksharing, pp. 241-250 (2011).

Beraud, et al., "Using cyber maneuver to improve network resiliency," Military Communications Conference, pp. 1121-1126 (2011).

Boyd & Keromytis, "SQLrand: Preventing SQL Injection Attacks," ACNS: International Conference on Applied Cryptography and Network Security, pp. 292-302 (2004).

Christodorescu, et al., "End-to-End Software Diversification of Internet Services," Advances in Information Security 54, Moving Target Defense, pp. 117-130 (2011).

Colbaugh & Glass, "Predictability-oriented defense against adaptive adversaries," IEEE International Conference on Systems, Man, and Cybernetics, pp. 2721-2727 (2012).

Colbaugh & Glass, "Proactive defense for evolving cyber threats," Intelligence and Security Informatics, Proceedings of 2011 IEEE International Conference on Intelligence and Security Informatics, 6 pages (2011).

Cox, et al., "N-variant systems: a secretless framework for security through diversity: Defense Technical Information Center," USENIX Association, Security '06: 15th Usenix Security Symposium, pp. 105-120 (2006).

Cui & Stolfo, "Symbiotes and defensive Mutualism: Moving Target Defense," Advances in Information Security 54, Moving Target Defense, pp. 99-108 (2011).

Dsouza, et al., "Resilient Dynamic Data Driven Application Systems (rDDDAS)," Procedia Computer Science 18, pp. 1929-1938 (2013).

Dunlop, et al., "MT6D: A Moving Target IPv6 Defense," Military Communications Conference, pp. 1321-1326 (2011).

Evans, et al., "Effectiveness of moving target defenses," Advances in Information Security 54, Moving Target Defense, pp. 29-48 (2011).

Furnell, "Why users cannot use security," Computers & Security 24(4), pp. 274-279.

Groat, et al., "Using an IPv6 moving target defense to protect the Smart Grid. Innovative Smart Grid Technologies," IEEE PES Innovative Smart Grid Technologies, 7 pages (2012).

Groat, et al., "Using dynamic addressing for a moving target defense," Proceedings of the 6th International Conference on Information Warfare and Security, pp. 84-91 (2011).

Haas, et al., "Machine-oriented biometrics and cocooning for dynamic network defense," Proceedings of the Eighth Annual Cyber Security and Information Intelligence Research Workshop, art. No. 33, 4 pages (2013).

Huang & Ghosh, "Introducing Diversity and Uncertainty to Create Moving Attack Surfaces for Web Services," Advances in Information Security 54, Moving Target Defense, pp. 131-151 (2011).

Jackson, et al., "Compiler-Generated Software Diversity," Advances in Information Security 54, Moving Target Defense, pp. 77-98 (2011).

Jackson, et al., "Diversifying the Software Stack Using Randomized NOP Insertion," Advances in Information Security 100, Moving Target Defense II, pp. 151-173 (2012).

KC, et al., "Countering code-injection attacks with instruction-set randomization," Proceedings of the 10th ACM conference on Computer and communications security, pp. 272-280 (2003).

Kewley, et al., "Dynamic approaches to thwart adversary intelligence gathering," Proceedings of the DARPA Information Survivability Conference & Exposition II, 10 pages (2001).

Le Goues, et al., "Moving Target Defenses in the Helix Self-Regenerative Architecture," Advances in Information Security 100, Moving Target Defense II, pp. 117-149 (2012).

Lyon, "Nmap Network Scanning: The Official Nmap Project Guide to Network Discovery and Security Scanning," Insecure.Com LLC, 434 pages (2008).

Nguyen-Tuong, et al., "On the effectiveness of the metamorphic shield," Proceedings of the Fourth European Conference on Software Architecture: Companion Volume, pp. 170-174 (2010).

Nguyen-Tuong, et al., "Security through redundant data diversity," IEEE International Conference on Dependable Systems and Networks With FTCS and DCC, pp. 187-196 (2008).

Phatak, "Spread-Identity mechanisms for DOS resilience and Security," First International Conference on Security and Privacy for Emerging Areas in Communications Networks, 12 pages (2005).

Phatak, et al., "Spread Identity: A new dynamic address remapping mechanism for anonymity and DDoS defense," Journal of Computer Security 21(2), pp. 233-281 (2013).

Portokalidis & Keromytis, "Global ISR: Toward a Comprehensive Defense Against Unauthorized Code Execution," Advances in Information Security 54, Moving Target Defense, pp. 49-76 (2011).

Rinard, "Manipulating Program Functionality to Eliminate Security Vulnerabilities," Advances in Information Security 54, Moving Target Defense, pp. 109-115 (2011).

Roeder & Schneider, "Proactive obfuscation," ACM Transactions on Computer Systems 28(2), art. No. 4, 54 pages (2010).

Scandariato & Knight, "The design and evaluation of a defense system for Internet worms," Proceedings of the 23rd IEEE International Symposium on Reliable Distributed Systems, pp. 164-173 (2004).

Shi, et al., "Full Service Hopping for Proactive Cyber-Defense," IEEE International Conference on Networking, Sensing and Control, pp. 1337-1342 (2008).

Shi, et al., "Port and Address Hopping for Active Cyber-Defense," PAISI: Pacific-Asia Workshop on Intelligence and Security Informatics, pp. 295-300 (2007).

Stanton, et al., "Analysis of end user security behaviors," Computers & Security 24(2), pp. 124-133 (2005).

U.S. Notice of Allowance dated Nov. 18, 2015.

U.S. Office Action dated Aug. 21, 2015.

U.S. Office Action on U.S. Appl. No. 15/282,875 dated Apr. 5, 2018.

Yackoski, et al., "Applying Self-Shielding Dynamics to the Network Architecture," Advances in Information Security 100, Moving Target Defense II, pp. 97-115 (2012).

Zank, "Moving Target Defense," Coronado Group, 6 pages (2012).

(56) References Cited

OTHER PUBLICATIONS

Zhuang, et al., "Simulation-based Approaches to Studying Effectiveness of Moving-Target Network Defense," National Symposium on Moving Target Research, 12 pages (2012).

* cited by examiner

SOFTWARE DEFINED NETWORKING MULTIPLE OPERATING SYSTEM ROTATIONAL ENVIRONMENT

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD

The present disclosure relates generally to systems that thwart cyber-attacks and data theft by employing moving target defense ("MTD" hereafter). In particular, the disclosure relates to systems and methods that utilize a software defined networking multiple operating system rotational environment ("SMORE" hereafter) to counter cyber-attack attempts.

BACKGROUND

Cyber-attacks continue to pose a major threat to computing systems. Some attacks utilize unauthorized capture of data including network data. TCP/IP packets, for instance, contain data required for two network interfaces to communicate including source and destination IP addresses, ports, protocol type, etc. Unauthorized individuals may gain useful information on who is communicating and what is being communicated by intercepting packets at various levels and locations during the transit of the packets.

SUMMARY

One aspect of the present disclosure relates to a system configured for utilizing software defined networking for a multiple operating system rotational environment. The system may include one or more hardware processors configured by machine-readable instructions. The processor(s) may be configured to receive a request from a user device. The request may include a first destination address. The processor(s) may be configured to determine a packet of the request does not match an existing flow modification. The processor(s) may be configured to forward the packet of the request to a controller server consequent to the determination. The processor(s) may be configured to receive a flow modification from the controller server based on the forwarded packet. The processor(s) may be configured to modify further received packets from the user device based on the received flow modification. In some implementations of the system, the processor(s) may be configured to determine the received request is directed to a dummy host based on a MAC address or IP address associated with the dummy host.

In some implementations of the system, the flow modification from the controller server may include the destination address and the port of the first server. In some implementations of the system, modifying further received packets from the user device based on the received flow modification may include executing the flow modification on an SDN switch. In some implementations of the system, the received flow modification may be a first flow modification and wherein modifying further received packets from the user device is done during a first timeout period. In some implementations of the system, the processor(s) may be configured to, after the first timeout period, forward an additional packet from the user device to the controller server, receive a second flow modification from the controller server based on the additional packet, and modify further received packets, during a second timeout period, from the user device based on the received second flow modification.

In some implementations of the system, the processor(s) may be configured to, after the first timeout period, modify further received packets, during a second timeout period, from the user device based on the received second flow modification. In some implementations of the system, the processor(s) may be configured to route, during the first timeout period, the received request to a dummy host. In some implementations of the system, the processor(s) may be configured to determine the additional packet is directed to a dummy host based on a MAC address or IP address associated with the dummy host. In some implementations of the system, the first flow modification from the controller server may include the destination address and the port of the first server. In some implementations of the system, the second flow modification from the controller server may include the destination address and the port of the second server. In some implementations of the system, modifying further received packets from the user device, during the first timeout period, based on the received first flow modification may include executing the first flow modification on an SDN switch. In some implementations of the system, modifying further received packets from the user device, during the second timeout period, based on the received second flow modification may include executing the second flow modification on the SDN switch. In some implementations of the system, the first timeout period may be one of an idle timeout, wherein the first flow modification is no longer executed after no received packets are associated with the first flow modification after a predetermined period of time or a hard timeout, wherein the first flow modification is no longer executed after a predetermined time after execution of the first flow modification begins.

In some implementations of the system, the first flow modification may be no longer executed after no received packets are associated with the first flow modification after a predetermined period of time or a hard timeout. In some implementations of the system, the first flow modification may be no longer executed after a predetermined time after execution of the first flow modification begins.

Another aspect of the present disclosure relates to a method for utilizing software defined networking for a multiple operating system rotational environment, executing on a computing device. The method may include receiving a request from a user device. The request may include a first destination address. The method may include determining a packet of the request does not match an existing flow modification. The method may include forwarding the packet of the request to a controller server consequent to the determination. The method may include receiving a flow modification from the controller server based on the forwarded packet. The method may include modifying further received packets from the user device based on the received flow modification.

Yet another aspect of the present disclosure relates to a non-transient computer-readable storage medium having instructions embodied thereon, the instructions being executable by one or more processors to perform a method for utilizing software defined networking for a multiple operating system rotational environment, executing on a computing device. The method may include receiving a request from a user device. The request may include a first destination address. The method may include determining a packet of the request does not match an existing flow modification. The method may include forwarding the packet of the request to a controller server consequent to the determination. The method may include receiving a flow modification from the controller server based on the forwarded packet. The method may include modifying further received packets from the user device based on the received flow modification.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

These and other advantages and features of the invention, together with the organization and manner of operation thereof, will become apparent from the following detailed description when taken in conjunction with the accompanying drawings.

DETAILED DESCRIPTION

Referring to the figures generally, systems and methods are illustrated for utilizing software defined networking ("SDN") to programmatically switch the flow of packets from users to a given set of servers. In some implementations, periodic switching of servers that respond to users' requests present an ever-changing stack of software to a potential attacker making it difficult to perform reconnaissance or develop exploits. In some implementations, such as when the servers are functionally equivalent to typical users, the typical users do not notice a difference in functionality. However, a potential attacker would need to be deeply familiar with each respective software stack of the servers that are constantly changing to successfully exploit the entire system.

In some implementations, logic is added to a data-link layer to direct packets toward the appropriate host in moving target defense ("MTD") applications. This solves a technical problem in some moving target defense systems to allow transferring of large files which otherwise would exceed the time of a single rotation window. In some implementations, the problem is solved by directing all packets containing a new request to the next machine in rotation but allow packets from open connections to persist in situations such as large file transfers, video streaming, and real-time applications. This enables a generalized use of a moving target defense system without limitation to specific use cases. In some implementations, SMORE utilizes SDN to programmatically switch the flow of packets from users to a given set of servers. The servers that respond to users' requests are periodically switched. In some implementations, SMORE operates as a daemon (acting as SDN controller) that sends OpenFlow messages to network equipment to control how the network equipment handles network packets. In some implementations, the mechanism to control packet flows is a modification of the destination IP for all incoming packets. This modification may be controlled by the OpenFlow messages sent from the SMORE daemon and is periodically updated after a given rotation period with a new destination IP with which to modify the packets. In some implementations, SDN is used to add the necessary logic to the data-link layer to direct packets toward the appropriate host in MTD applications. OpenFlow, a common SDN protocol, allows per packet matching and modification based on layer 2 (MAC Addresses), layer 3 (IP addresses), and layer 4 (TCP/UDP ports). This may enable SDN packet flows to be constructed such that new connections can be rotated among multiple hosts while existing connections are kept to a single host. This maintains connections across rotation window boundaries while still achieving diversity of the software stack. In some implementations, SMORE solves a technical problem of computing environments with a lack of software diversity leaving static targets available for reconnaissance and exploitation by attackers. A solution to the technical problem is a proactive mechanism to shift the software a user interacts with thereby limiting the time that attackers can interact with a respective system. In addition, vulnerable software can be removed from the environment seamlessly upon disclosure of a vulnerability. In some implementations, a solution comprises use of SDN to control the flow of data to users without forcibly disconnecting the machines from further communication. Further, the machines may be setup statically utilizing typical system administrator practices but controlling what users interact with through manipulation of their traffic (e.g., session cookies) to a given host.

Figure 1:
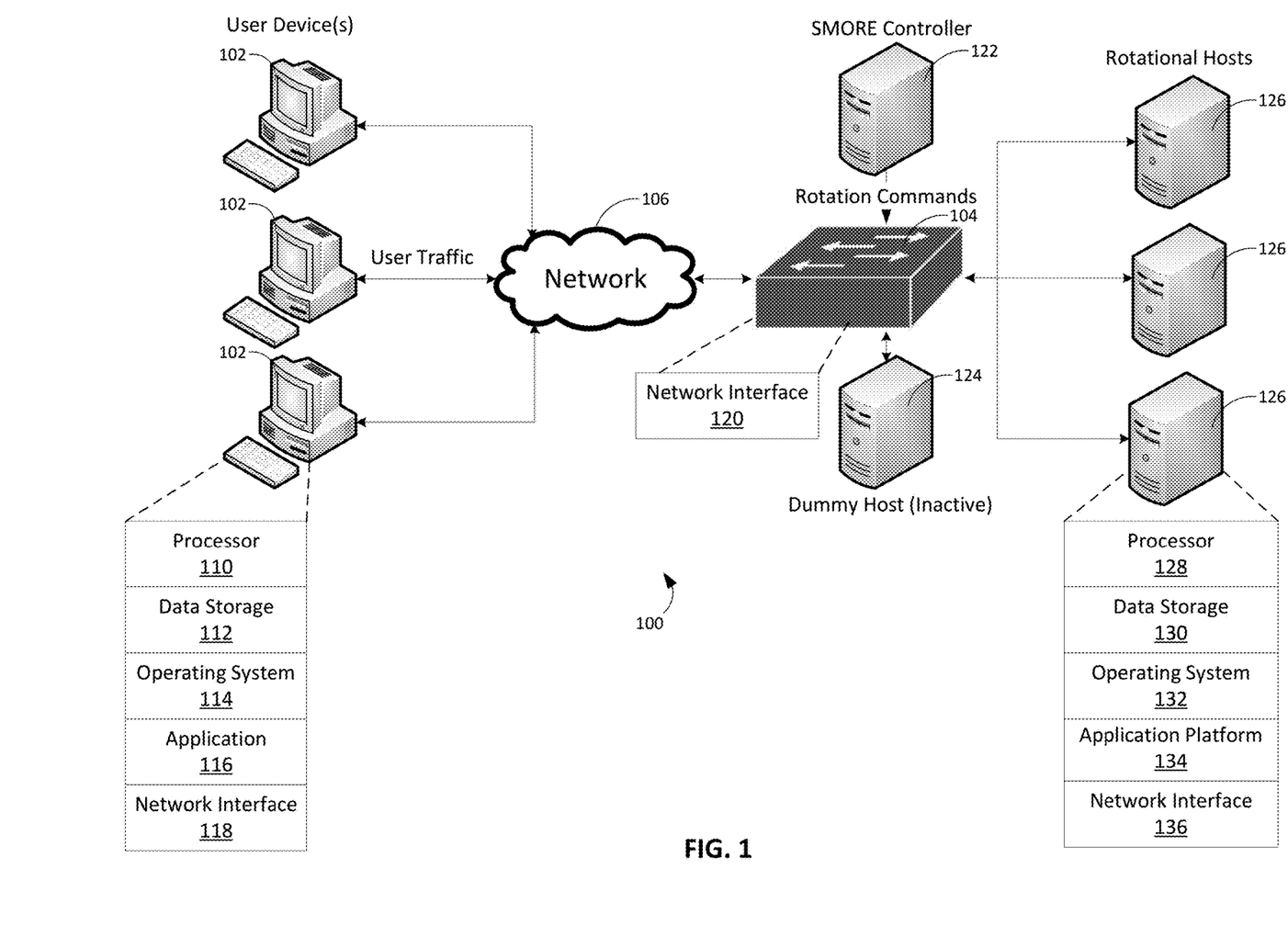
FIG. 1 is a block diagram of an environment for utilizing SDN to programmatically switch the flow of packets from users to a given set of servers according to an example implementation.

Referring to FIG. 1, a block diagram of an environment 100 for utilizing SDN to programmatically switch the flow of packets from users to a given set of servers. The environment 100 comprises user device(s) 102 connected through a network 106 to an SDN switch 104. The environment 100 further comprises a SMORE controller 122, Dummy Host 124, and rotational host server 126 communicatively connected to the SDN switch 104. In some implementations, user device(s) 102 may comprise any of desktop computers, laptop computers, tablet computers, smart phones, e-readers, set top boxes, game systems, smartwatches, and the like.

The user device(s) 102 are shown to contain a processor 110, data storage 112, an operating system 114, an application 116, and a network interface 118. The data storage 112 may store machine instructions that, when executed by the processor 110, cause the processor 110 to perform one or more of the operations described herein. The processor 110 may include one or more microprocessors, application specific integrated circuits (ASICs), field programmable gate arrays (FPGAs), other forms of processing circuits, or combinations thereof. The data storage 112 may include, but is not limited to, electronic, optical, magnetic, or any other storage or transmission device capable of providing the processor 110 with program instructions. The data storage 112 may include storage devices such as a floppy disk, CD-ROM, DVD, magnetic disk, memory chip, ROM, RAM, EEPROM, EPROM, flash memory, optical media, or any other suitable memory from which the processor 110 can read instructions and/or data. The processor 110 and the data storage 112 may form a processing module. The data storage 112 may include files to run an operating system 114 and an application 116.

The rotational host servers 126 are shown to contain a processor 128, data storage 130, an operating system 132, an application platform 134 and a network interface 136. The data storage 130 may store machine instructions that, when executed by the processor 128, cause the processor 128 to perform one or more of the operations described herein. The processor 128 may include one or more microprocessors, application specific integrated circuits (ASICs), field programmable gate arrays (FPGAs), other forms of processing circuits, or combinations thereof. The data storage 130 may include, but is not limited to, electronic, optical, magnetic, or any other storage or transmission device capable of providing the processor 128 with program instructions. The data storage 130 may include storage devices such as a floppy disk, CD-ROM, DVD, magnetic disk, memory chip, ROM, RAM, EEPROM, EPROM, flash memory, optical media, or any other suitable memory from which the processor 128 can read instructions and/or data. The processor 128 and the data storage 130 may form a processing module. The data storage 130 may include files to run an operating system 132 and an application platform 136. In some implementations, the respective application platforms 136 of a plurality of rotational host servers 126 that are grouped for availability in a rotation shift layers of a service's software stack. In other words, each respective rotational host server 126 has a configured and maintained software stack to serve a single application that are different from each other. This configuration results in any potentially vulnerable component having only a limited duration of exposure to an attacker.

In the environment 100, data communication between the user device(s) 102 and the SDN switch 104 are facilitated by the network 106. In some arrangements, the network 106 includes the internet. In other arrangements or combinations, the network 106 includes a local area network or a wide area network. The network 106 is facilitated by short and/or long-range communication technologies including Bluetooth® transceivers, Bluetooth® beacons, RFID transceivers, NFC transceivers, Wi-Fi transceivers, cellular transceivers, microwave transmitters, software radio, wired network connections (e.g., Ethernet), etc.

The user device(s) 102 as shown in FIG. 1, comprise an application 116. The user device(s), SDN switch 104, and rotational host servers 126 are shown to include a network interface 118, network interface 120, and network interface 136 respectively. SMORE controller 122 and dummy host 124 also comprise network interfaces (not shown) to communicate with SDN switch 104. In some implementations, the network interfaces allow data to pass to and from the network 106 (e.g., the internet). In some implementations, the network interfaces include the hardware and logic necessary to communicate over multiple channels of data communication. For example, they may include an Ethernet transceiver, a cellular modem, a BLUETOOTH transceiver, a BLUETOOTH beacon, an RFID transceiver, and/or an NFC transmitter. Data passing through the network interfaces may be encrypted such that the interfaces are secure communication modules.

In some implementations, the SDN switch 104 is configured to generate and send Ethernet frames. The SDN switch 104 may be configured to modify incoming packets (e.g., from an application 116 of a user device 102) with a destination address and port of an active rotational host server (e.g., a rotational host server 126). In some implementations, the SDN switch 104 is configured to forward a modified packet to a controller (e.g., SMORE controller 122). The SDN switch 104 may be configured to receive a flow modification from the controller. For example, the flow modification may configure the SDN switch 104 to modify any packets addressed to a dummy host (e.g., dummy host 124) with the destination address and port (e.g., 10.0.0.2 on port 81 or the like) of an active rotational host (e.g., a rotational host server 126). The SDN switch 104 may be configured to receive a complementary flow modification from the controller. For example, the complementary flow modification may further configure the SDN switch 104 to modify any packets from the active rotation host to a client user device (e.g., user device 102) with the source MAC address and IP address of the dummy host which was the original intended recipient of the traffic from the client user device. In some implementations, the first flow modification and the complementary flow modification may be received simultaneously. In some implementations, the SDN switch 104 is configured to keep the received flow modifications in a cache of the SDN switch 104 until they expire. Expiration may be through a timeout specified and received from a controller (e.g., SMORE controller 122). In some implementations, a flow timeout is an idle timeout, where the SDN switch 104 is configured to remove a flow modification after no packets have matched against it for a given period of time. In some implementations, a flow timeout is a hard timeout, where the SDN switch 104 is configured to remove a flow modification after a fixed amount of time since implementation of the flow modification, since receipt of the flow modification, and the like. In one non-limiting example, a flow modification configures an SDN switch 104 for a 1-5 second idle timeout and no hard timeout. The flow modification may further configure the SDN switch 104 to allow host specific flows for large file downloads to persist to completion despite expiration of the timeout. In some implementations, the SDN switch 104 is configured to handle traffic on a per-packet basis where received packets are directed to an existing flow with an existing flow modification or directed to a new flow received from the SMORE controller 122 when the received packet is an unmatched packet.

In some implementations, the SMORE controller 122 is configured to receive one or more incoming packets from an SDN switch 104. The SMORE controller 122 may be configured to create a flow modification based on the one or more incoming packets and send the flow modification to the SDN switch 104. The flow modification may configure the SDN switch 104 to modify any packets addressed to a dummy host (e.g., dummy host 124) with the destination address and port (e.g., 10.0.0.2 on port 81 or the like) of an active rotational host (e.g., a rotational host server 126). The SMORE controller 122 may be configured to send a complementary flow modification to the SDN switch 104 to configure the SDN switch 104 to modify any packets from the active rotation host to a client user device (e.g., user device 102) with the source MAC address and IP address of the dummy host which was the original intended recipient of the traffic from the client user device. In some implementations, the flow modification and the complementary flow modification may be received simultaneously. In some implementations, the flow modification(s) specify a type of timeout. When a particular rotational host server 126 is active, it is able to communicate with the user devices 102 via the SDN switch 104 by conversion of its packets to the MAC and IP address of the dummy host 124.

In some implementations, the dummy host 124 is configured to receive one or more packets from a user device (e.g., user device 102) via an SDN switch 104. The dummy host 124 is further configured to respond to the SDN switch 104 with a MAC address or IP address. In some implementations, the dummy host 124 is a virtual server or simulated server and is not a physical, separate server. The dummy host 124 may be a virtual server or simulated server simulated in the SDN switch 104, in the SMORE controller server 122, some other server/computer communicatively connected to the SDN switch 104, and the like.

Figure 2:
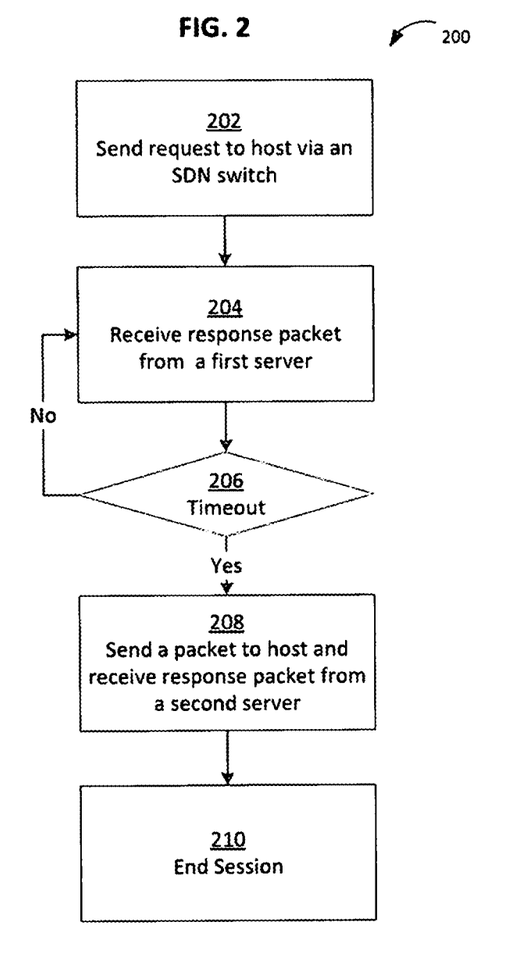
FIG. 2 is a flow diagram of a method of sending a SMORE request according to an example implementation.

Referring to FIG. 2, a flow diagram of a method 200 for sending a SMORE request is shown according to an example implementation. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices (e.g., user device(s) 102) executing some or all of the operations of method 200 in response to instructions stored electronically on an electronic storage medium. In brief, method 200 may comprise sending a request to a host via an SDN switch 104, receiving a response packet from a first server, waiting for a timeout period, sending a packet to the host via the SDN switch after the timeout period, and receiving a response packet from a second server responsive to sending the packet to the host.

An operation 202 may include sending a request to a host via an SDN switch 104. In some implementations, a client (e.g., user device 102) makes a request to a dummy host 124 via an SDN switch 104. The request comprises one or more packets.

An operation 204 may include receiving a response packet from a first server. In some implementations, the first server is an active rotational host server 126 and the response is received via an SDN switch 104. The response packet may comprise the MAC and/or IP address of a dummy host 124. The device receiving the response packet (e.g., a user device 102) may ignore the packet's content if the response packet is from an unknown source IP and not the IP address of the dummy host 124 and may perform a TCP reset.

An operation 206 may include waiting for a timeout period. In some implementations, the user device 102 is not aware of which timeout period is currently active or when a timeout period has been exceeded. In some implementations, the timeout period comprises an amount of time corresponding to an idle timeout, where the SDN switch 104 is configured to remove a flow modification after no packets have matched against it for a given period of time. In some implementations, the timeout period comprises an amount of time corresponding to a hard timeout, where the SDN switch 104 is configured to remove a flow modification after a fixed amount of time since implementation of the flow modification, since receipt of the flow modification, and the like.

Figure 3:
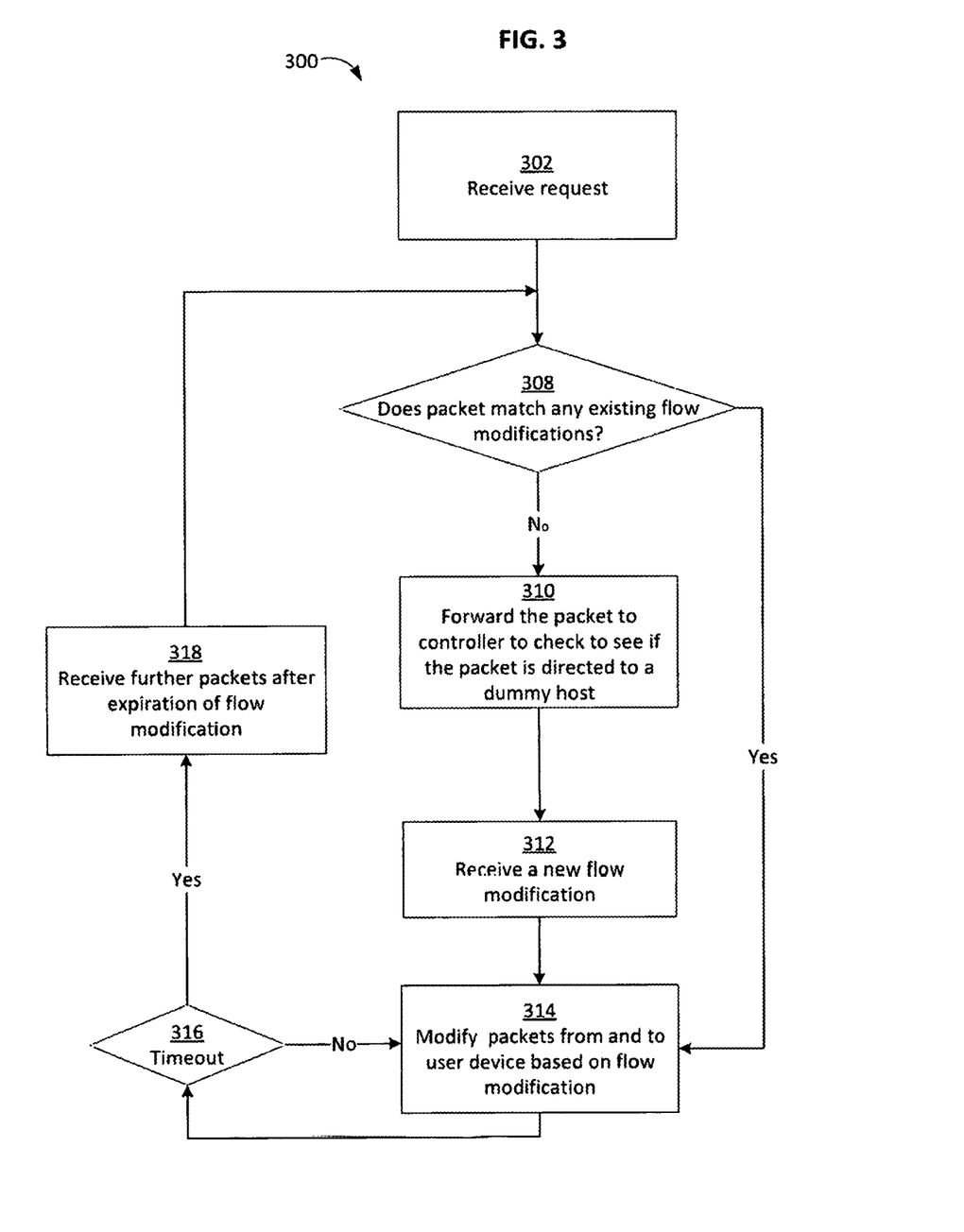
FIG. 3 is a flow diagram of a method of serving a SMORE request according to an example implementation.

An operation 208 may include sending additional one or more packets to a host via an SDN switch. In some implementations, a client (e.g., user device 102) makes a request to a dummy host 124 via an SDN switch 104. The additional one or more packets are sent after a timeout period has been exceeded. The operation 208 may include receiving a response packet from a second server, different than the first server. In some implementations, the second server is an active rotational host server 126 and the response is received via an SDN switch 104. The response packet may comprise the MAC and/or IP address of a dummy host 124. The device receiving the response packet (e.g., a user device 102) may ignore the packet's content if the response packet is from an unknown source IP and not the IP address of the dummy host 124 and may perform a TCP reset. An operation 210 may include ending a communication session. The communication session FIG. 3 illustrates a method 300 of serving a SMORE request according to an example implementation. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting. In some implementations, method 300 may be implemented in one or more processing devices (e.g., a digital processor, an analog processor, a digital circuit designed to process information, an analog circuit designed to process information, a state machine, and/or other mechanisms for electronically processing information) such an SDN switch 104. The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. In brief, method 300 comprises receiving a request, checking if a packet is directed to a dummy host and checking to see if the packet matches any existing flow modifications. If the packet matches an existing flow modification, the method 300 continues by modifying packets from and to a user device based on the existing flow modification. If the packet does not match an existing flow modification, the method 300 continues by forwarding the packet to a controller server, receiving a new flow modification from the controller server based on the forwarded packet, and modifying packets from and to a user device based on the new flow modification. During a timeout period, further packets may be modified according to the flow modification in effect. After the timeout period has elapsed, a further packet is checked to see if it is directed to a dummy host and checked to see if the packet matches any existing flow modifications.

An operation 302 may include receiving a request from a device (e.g., a user device 102). In some implementations, the request comprises one or more packets comprising an IP address to a dummy host 124 communicatively coupled to an SDN switch 104 receiving the request.

An operation 308 may include determining whether the one or more packets of the request matches any existing flow modifications. If the one or more packets of the request matches an existing flow modification, the method may proceed to operation 314 and modify further received packets from a user device (e.g., user device 102) based on the existing flow modification. If the one or more packets of the request does not match an existing flow modification, the method may proceed to operation 310, where at least one of the one or more packets of the request is forwarded to a controller server (e.g., SMORE controller 122). The controller server checks whether at least one of the one or more forwarded packets is directed to a dummy host. In some implementations, the dummy host is a dummy host 124. In some implementations, the dummy host is simulated in software. If the at least one of the one or more forwarded packets is directed to a dummy host, the controller server creates a new flow modification based on the forwarded packet, wherein the new flow modification comprises a destination address and a port of a first server (e.g., a rotational host server 126). In some implementations, the first server is the current active server in a plurality of servers in a rotational group of servers. If the first server is not in rotation to be included in the new flow modification, the new flow modification comprises a destination address and a port of a second server, or a third server, and so on.

An operation 312 may include receiving a flow modification from the controller server based on the forwarded packet. In some implementations, the controller server is a SMORE controller 122. For example, execution of the flow modification may configure an SDN switch 104 to modify any packets addressed to a dummy host (e.g., dummy host 124) with the destination address and port (e.g., 10.0.0.2 on port 81 or the like) of an active rotational host (e.g., a rotational host server 126). Operation 312 may include receiving a complementary flow modification from the controller server. For example, the complementary flow modification may further configure the SDN switch 104 to modify any packets from the active rotation host to a client user device (e.g., user device 102) with the source MAC address and IP address of the dummy host 124 which was the original intended recipient of the traffic from the client user device. In some implementations, the first flow modification and the complementary flow modification may be received simultaneously. In some implementations, execution of the flow modification(s) prevents the client user device from responding to an unknown source IP with TCP reset and ignore the packet's contents. In some implementations, the received flow modifications are stored in a cache of the SDN switch 104 until they expire. Expiration may be through a timeout specified and received from a controller server (e.g., SMORE controller 122). In some implementations, a flow timeout is an idle timeout, where a flow modification is no longer executed or removed after no packets have matched against it for a given period of time. In some implementations, a flow timeout is a hard timeout, where a flow modification is removed after a fixed or predetermined amount of time since implementation of the flow modification, since receipt of the flow modification, and the like.

An operation 314 may include modifying further received packets from a user device (e.g., user device 102) based on the received flow modification. In some implementations, execution of the received flow modification determines how the received packets are modified. For example, the packets received from user device 102 that are addressed to dummy host 124 are modified with the destination address and port (e.g., 10.0.0.2 on port 81 or the like) of an active rotational host (e.g., a rotational host 126). The packets received from the active rotational host server 126 that are addressed to the user device 102 are modified with the source MAC address and IP address of the dummy host 124.

An operation 316 may include determining whether a timeout period is still in effect. In some implementations, the determination of which rotational host server 126 is active is accomplished through the use of flow timeout periods. Expiration of a timeout period may be through a timeout specified and received from a controller (e.g., SMORE controller 122). In some implementations, a flow timeout is an idle timeout, where a flow modification is removed after no packets have matched against it for a given period of time. In some implementations, a flow timeout is a hard timeout, where a flow modification is removed after a fixed amount of time since implementation of the flow modification, since receipt of the flow modification, and the like.

An operation 318 may include receiving further packets from the user device (e.g., user device 102). One or more of the further received packets can be checked to see if they are directed to a dummy host at 304 in a continuation of method 300. A new flow modification may be received at 312 comprising a destination address and a port of a different server than the first server (e.g., a second server, or a third server, and so on). The modified packet can then be forwarded to the controller server in operation 310 to continue method 300.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 4:
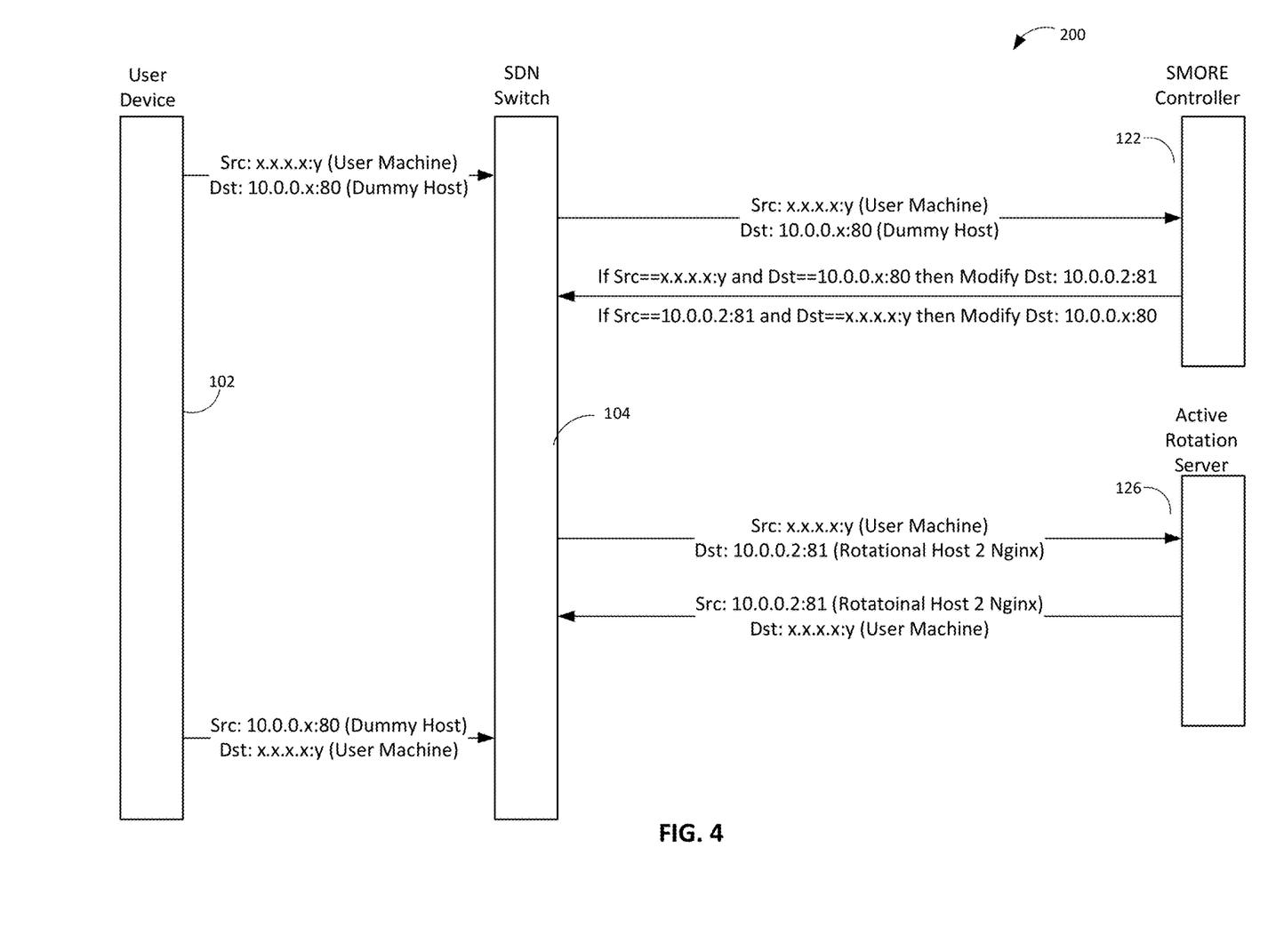
FIG. 4 is a flow diagram of an example communication session between a user device and an active rotation server using an SDN switch and a SMORE controller.

Referring to FIG. 4, a flow diagram of a communication session between a user device (e.g., 102) and an active rotation server (e.g., a rotational host server 126) using an SDN switch (e.g., SDN switch 104) and a SMORE controller (e.g., SMORE controller 122) according to an example implementation. FIG. 4 illustrates an example communication session of method 300.

As noted above, implementations within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations have been described in the general context of method steps which may be implemented in one implementation by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, implementations may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Implementations may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the implementations might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions may be made in the design, operating conditions and arrangement of the implementations without departing from the scope of the present disclosure as expressed in the appended claims.

What is claimed is:

1. A system configured for utilizing software defined networking for a multiple operating system rotational environment, the system comprising:
   one or more hardware processors configured by machine-readable instructions to:
      receive a request from a user device, wherein the request comprises a first destination address;
      determine a packet of the request does not match an existing flow modification;
      forward the packet of the request to a controller server consequent to the determination;
      receive a first flow modification from the controller server based on the forwarded packet;
      modify further received packets from the user device based on the received first flow modification during a first timeout period; and
      after the first timeout period:
         forward an additional packet from the user device to the controller server;
         receive a second flow modification from the controller server based on the forwarded additional packet; and
         modify further received packets from the user device based on the received second flow modification.

2. The system of claim 1, wherein the one or more hardware processors are further configured by machine-readable instructions to:
   determine if the received request is directed to a dummy host based on a MAC address or IP address associated with the dummy host.

3. The system of claim 1, wherein the first flow modification from the controller server comprises the destination address and the port of a first server, and wherein modifying further received packets from the user device based on the received flow modification comprises executing the first flow modification on an SDN switch.

4. The system of claim 1, wherein the one or more hardware processors are further configured by machine-readable instructions to:
   determine the additional packet is directed to a dummy host based on a MAC address or IP address associated with the dummy host.

5. The system of claim 1, wherein the first flow modification from the controller server comprises a destination address and a port of a first server, wherein the second flow modification from the controller server comprises a destination address and a port of a second server, wherein modifying further received packets from the user device, during the first timeout period, based on the received first flow modification comprises executing the first flow modification on an SDN switch, and wherein modifying further received packets from the user device, during the second timeout period, based on the received second flow modification comprises executing the second flow modification on the SDN switch.

6. The system of claim 1, wherein the first timeout period is one of an idle timeout, wherein the first flow modification is no longer executed after no received packets are associated with the first flow modification after a predetermined period of time or a hard timeout, wherein the first flow modification is no longer executed after a predetermined time after execution of the first flow modification begins.

7. A method of utilizing software defined networking for a multiple operating system rotational environment, executing on a computing device, comprising:
receiving a request from a user device, wherein the request comprises a first destination address;
determining a packet of the request does not match an existing flow modification;
forwarding the packet of the request to a controller server consequent to the determination;
receiving a first flow modification from the controller server based on the forwarded packet;
modifying further received packets from the user device based on the received first flow modification during a first timeout period; and
after the first timeout period:
 forwarding an additional packet from the user device to the controller server;
 receive a second flow modification from the controller server based on the forwarded additional packet; and
 modifying further received packets from the user device based on the received second flow modification.

8. The method of claim 7, further comprising determining if the received request is directed to a dummy host based on a MAC address or IP address associated with the dummy host.

9. The method of claim 7, wherein the first flow modification from the controller server comprises the destination address and the port of a first server, and wherein modifying further received packets from the user device based on the received flow modification comprises executing the first flow modification on an SDN switch.

10. The method of claim 7, further comprising: determining the additional packet is directed to a dummy host based on a MAC address or IP address associated with the dummy host.

11. The method of claim 7, wherein the first flow modification from the controller server comprises a destination address and a port of a first server, wherein the second flow modification from the controller server comprises a destination address and a port of a second server, wherein modifying further received packets from the user device, during the first timeout period, based on the received first flow modification comprises executing the first flow modification on an SDN switch, and wherein modifying further received packets from the user device, during the second timeout period, based on the received second flow modification comprises executing the second flow modification on the SDN switch.

12. The method of claim 7, wherein the first timeout period is one of an idle timeout, wherein the first flow modification is no longer executed after no received packets are associated with the first flow modification after a predetermined period of time or a hard timeout, wherein the first flow modification is no longer executed after a predetermined time after execution of the first flow modification begins.

13. A non-transient computer-readable storage medium having instructions embodied thereon, the instructions being executable by one or more processors to perform a method comprising:
receiving a request from a user device, wherein the request comprises a first destination address;
determining a packet of the request does not match an existing flow modification;
forwarding the packet of the request to a controller server consequent to the determination;
receiving a first flow modification from the controller server based on the forwarded packet;
modifying further received packets from the user device based on the received first flow modification during a first timeout period; and
after the first timeout period:
 forwarding an additional packet from the user device to the controller server;
 receive a second flow modification from the controller server based on the forwarded additional packet; and
 modifying further received packets from the user device based on the received second flow modification.

14. The non-transient computer-readable storage medium of claim 13, the method further comprising determining if the received request is directed to a dummy host based on a MAC address or IP address associated with the dummy host.

15. The non-transient computer-readable storage medium of claim 13, wherein the first flow modification from the controller server comprises the destination address and the port of a first server, and wherein modifying further received packets from the user device based on the received flow modification comprises executing the first flow modification on an SDN switch.

16. The non-transient computer-readable storage medium of claim 13, the method further comprising determining the additional packet is directed to a dummy host based on a MAC address or IP address associated with the dummy host.

17. The non-transient computer-readable storage medium of claim 13, wherein the first flow modification from the controller server comprises a destination address and a port of a first server, wherein the second flow modification from the controller server comprises a destination address and a port of a second server, wherein modifying further received packets from the user device, during the first timeout period, based on the received first flow modification comprises executing the first flow modification on an SDN switch, and wherein modifying further received packets from the user device, during the second timeout period, based on the received second flow modification comprises executing the second flow modification on the SDN switch.

* * * * *